United States Patent [19]
Nakatani et al.

[11] Patent Number: 5,170,587
[45] Date of Patent: Dec. 15, 1992

[54] WEATHERSTRIP FOR AUTOMOTIVE VEHICLE

[75] Inventors: Masahiro Nakatani; Masahiro Nozaki; Takeshi Naitou, all of Nishikasugai, Japan

[73] Assignee: Toyoda Gosei Co., Ltd., Nishikasugai, Japan

[21] Appl. No.: 753,097

[22] Filed: Aug. 30, 1991

[30] Foreign Application Priority Data

Sep. 3, 1990 [JP] Japan .................. 2-230542
Oct. 31, 1990 [JP] Japan .................. 2-291860

[51] Int. Cl.$^5$ .................................. E06B 7/16
[52] U.S. Cl. ........................ 49/490; 49/479; 49/498
[58] Field of Search .......... 49/488, 479, 490, 497, 49/498; 296/216

[56] References Cited

U.S. PATENT DOCUMENTS

| | | | |
|---|---|---|---|
| 3,002,783 | 10/1961 | Hofmeister | 49/490 |
| 3,167,825 | 2/1965 | Zoller | 49/490 |
| 3,177,534 | 4/1965 | Millhouse et al. | 49/490 X |
| 3,333,381 | 8/1967 | Stark et al. | 49/488 X |
| 4,787,668 | 11/1988 | Kawase et al. | 49/497 X |
| 4,884,370 | 12/1989 | Nozaki et al. | 49/479 |
| 4,925,237 | 5/1990 | Bohn et al. | 49/488 X |
| 4,949,524 | 8/1990 | Martin et al. | 49/490 X |

Primary Examiner—Philip C. Kannan
Attorney, Agent, or Firm—Cushman, Darby & Cushman

[57] ABSTRACT

A weatherstrip having an upper lip and a support section on one side defining therebetween a panel receiving groove and having a hollow seal on the other side. A sponge rubber material is integrally provided with at least a portion of the upper lip and faces the panel receiving groove, to thus firmly bond with a panel and to absorb a bending deformation of the weatherstrip at corners of the panel. Such as a weatherstrip is particularly suitable for use as a weatherstrip for a sliding roof of an automotive vehicle.

9 Claims, 3 Drawing Sheets

WEATHERSTRIP FOR AUTOMOTIVE VEHICLE

BACKGROUND OF THE INVENTION

1. Field of the Invention

The present invention relates to a weatherstrip for an automotive vehicle. More specifically, the invention relates to a weatherstrip for a sliding roof.

2. Description of the Related Art

As schematically illustrated in FIG. 1, various automobiles are provided with sliding roof panels 1 on the roofs 4 and, typically, a weatherstrip 2 is laid generally along the outer peripheral edge of the sliding roof panel 1. The weatherstrip 2 is attached to the peripheral edge of the sliding roof panel 1 so that, when the roof opening of the roof 4 is closed, a water-proof and air-tight seal is established to prevent rain from leaking into the vehicle cabin and to prevent wind noise.

FIG. 2A shows the typical construction of a conventional weatherstrip mounting structure, taken along the line 2A—2A of FIG. 1.

As shown in FIG. 2A, the weatherstrip 2 is provided with a main body 23, an upper lip 24, a support section 25, and a panel receiving groove 21 extending along one side for receiving a panel member, such as a glass panel 1'. The weatherstrip 2 is also provided with a hollow seal 22 on the other side, and a gripping groove 20 in the lower side. The weatherstrip 2 is generally formed as a single body by an extrusion process. The main body 23 and the upper lip 24 are made of solid rubber or solid synthetic rubber, and only the hollow seal 22 is made of a sponge material such as foam rubber.

When mounting the weatherstrip 2 on the sliding roof panel 1, an adhesive 5 is applied to the panel receiving groove 21, and the weatherstrip 2 is then fitted along the outer peripheral edge of the glass panel 1'. Thereafter, the ends of the weatherstrip 2 are mated and bonded or otherwise connected to each other, and thus the weatherstrip 2 is fixedly mounted on the outer peripheral edge of the glass panel 1'.

A vertical extension 3, of the sliding roof inner panel 3 is inserted into the gripping groove 20, and the adhesive 5 is then applied to the clearance G defined by the lower surface of the glass panel 1', the inner side face of the weatherstrip 2 and the upper surface of the sliding roof inner panel 3, to thereby fixedly bond them to one another. A trim member 6 is then fitted on the inner peripheral edge of the sliding roof inner panel 3.

As noted above, the weatherstrip 2 is typically formed from a solid rubber piece, except for the hollow seal 22. Since the solid rubber piece has a low adhering ability, it can easily be detached, particularly at the interface between the weatherstrip 2 and the glass panel 1'. Moreover, since the weatherstrip 2 is formed by an extrusion process as a unitary body and wrapped around the peripheral edge which has four corners, a compression stress is constantly exerted on the portion inside the center axis L of the weatherstrip 2. This compression stress may cause the upper lip 24 to move away from the surface of panel 1', and thus occurs a gap 27, and in the worse case, form a puckering 26, as shown in FIG. 2B. This clearly degrades the appearance of the sliding roof panel 1.

SUMMARY OF THE INVENTION

An object of the present invention is to provide a novel construction for a weatherstrip for an automotive vehicle, by which the defects of the prior art as set forth above are avoided. Therefore, according to the present invention, a weatherstrip for an automotive vehicle has a panel receiving groove defined in one side thereof by an upper lip and a support section. The weatherstrip further has a sponge material provided at least on a portion of the upper lip and facing the panel receiving groove.

In a preferred construction, a sponge material layer is formed over a hollow seal section and covering an upper surface of a main body, the sponge material layer being integrally joined with the sponge material provided at the free end portion of the upper lip.

In an alternative embodiment, a plurality of strip sponge material layers are provided on the inner surface of the upper lip. In yet a further alternative, a sponge layer is formed on the entire inner surface of the upper lip.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings, all of which form a part of this specification, wherein like reference numerals designate corresponding parts in the various figures.

BRIEF DESCRIPTION OF THE DRAWINGS

FIGS. 2A and 2B are illustrations of the prior art, in which FIG. 2A shows a section taken along line 2A—2A of FIG. 1, and FIG. 2B is a perspective view of the corner section of the sliding roof panel;

DESCRIPTION OF THE PREFERRED EMBODIMENTS

Figure 1:
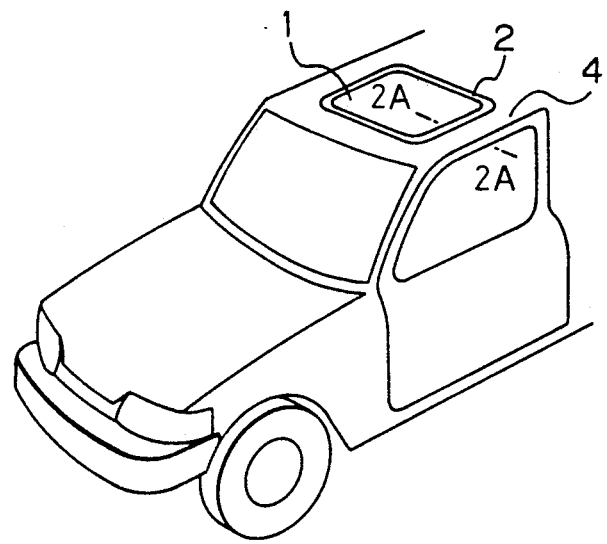
FIG. 1 is a fragmented perspective view of an automotive vehicle with a sliding roof panel.
Figure 3:
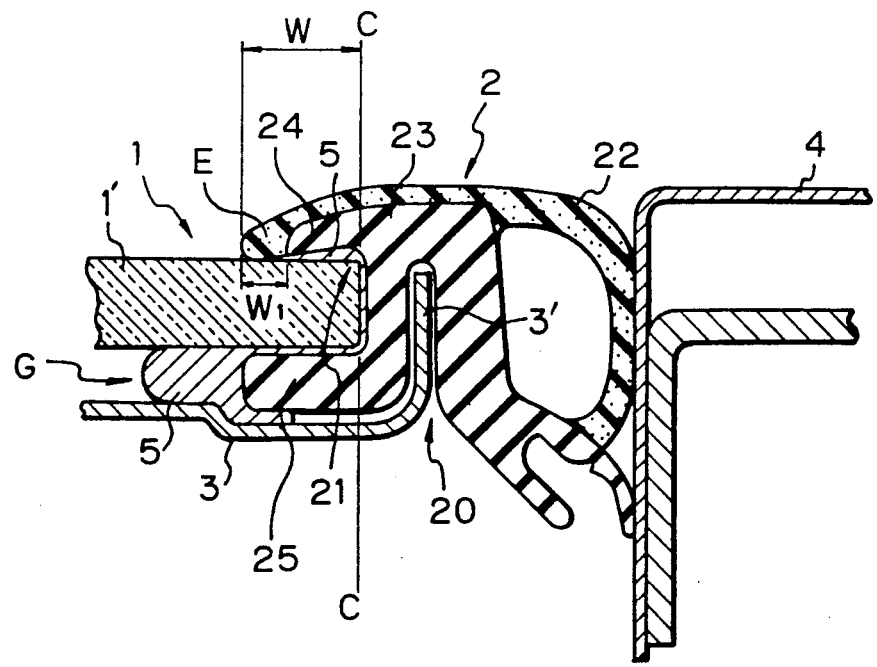
FIG 3 shows a section of a sliding roof panel, taken along a line similar to the line 2A—2A of FIG. 1, to which the preferred embodiment of a weatherstrip according to the present invention is mounted.
Figure 2A:
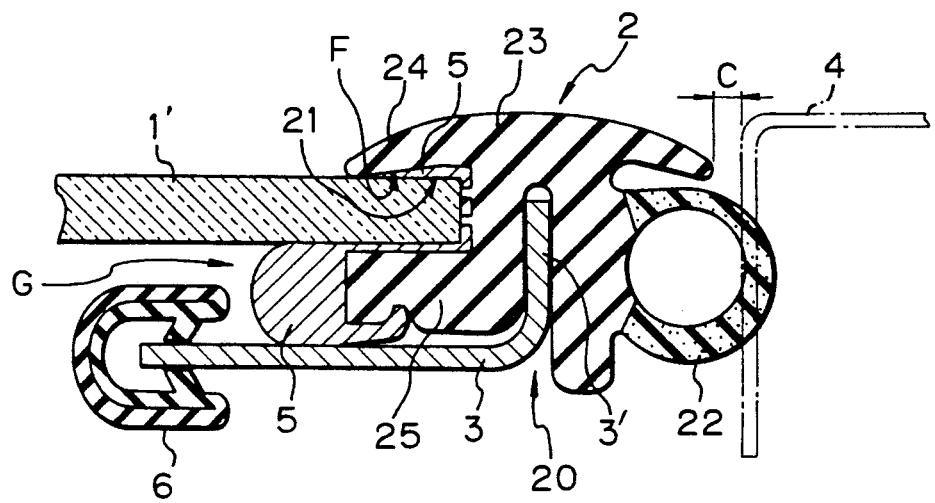

FIG. 3 is a sectional view taken along a line similar to the line 2A—2A of FIG. 1, in which the preferred embodiment of a weatherstrip, according to the present invention, is mounted to a sliding roof or sunroof of an automotive vehicle, in a manner similar to the prior art (FIG. 2A).

As shown, the weatherstrip 2 is provided with an upper lip 24 extending from a main body 23 and a lower support section 25, to thereby define a panel receiving groove 21 on one side surface thereof. The weatherstrip 2 is formed with a hollow seal 22 on the other side surface and a gripping groove 20 at the transverse center portion of the lower surface. The main body 23 of the weatherstrip 2 is formed from a solid rubber piece, but the hollow seal 22 and the upper surface covering layer of the main body 23 are formed from a sponge rubber. The sponge rubber covering layer extends and joins with a sponge material provided at the free end portion E of the upper lip 24. The free end portion E has a width W1, of about 1 mm from the free end edge of the upper lip 24. The weatherstrip 2 can be formed by a double layer extrusion process.

Similar to the prior art (FIG. 2A), the installation of the weatherstrip 2 thus constructed is carried out by applying an adhesive 5 to the panel receiving groove 21 and fitting the weatherstrip 2 onto the sliding roof panel 1 by engaging the panel receiving groove 21 with the outer peripheral edge of the glass panel 1'. Both ends of the weatherstrip 2 are then mated and bonded or otherwise connected to one another. The vertical extension 3' of the sliding roof inner panel 3 is inserted into the gripping groove 20 and elastically held therein. An adhesive 5 is then applied to clearance G defined by the lower surface of the glass panel 1', the inner side face of the weatherstrip 2, and the upper surface of the sliding roof inner panel 3, to bond them together. Then, an edge trim (not shown in FIG. 3 but corresponding to the trim 6 in FIG. 2A) is applied.

The thus assembled sliding roof panel 1 is illustrated in FIG. 3. Since the entire external surface of the weatherstrip 2 exposed to the exterior is uniformly covered by the sponge rubber, it can provide an integral and enhanced appearance.

On the other hand, since the sponge rubber material disposed at the free end portion E of the upper lip 24, and the sponge rubber material has a great bonding ability because of its porous structure, a very high bonding strength can be obtained. Therefore, separation of the weatherstrip 2 from the surface of the glass panel 1' is prevented. Furthermore, because the sponge rubber material has high elasticity, it can be firmly fitted even at corners, and thus can prevent deformation at the corners, or at least can absorb the deformation of the solid rubber piece so that the puckering which occurs in the prior art (as at 26 in FIG. 2B) does not occur. Therefore, an enhanced appearance is assured.

Figure 4A:
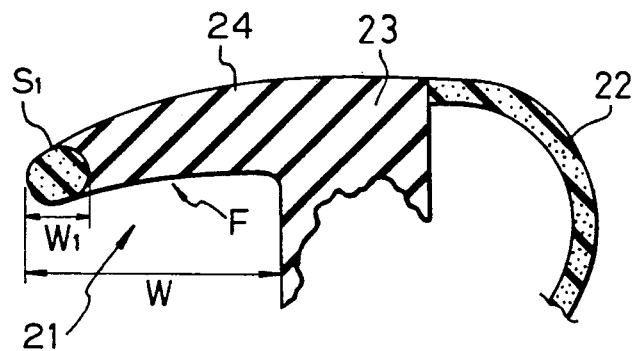
FIGS. 4A, 4B and 4C are partial sectional views showing modifications of the preferred embodiment of the weatherstrip of the invention.

In the embodiment of FIG. 4A, the overall body of the weatherstrip 2 is formed as a solid rubber including the hollow seal 22 which is made of sponge rubber. The upper lip 24 has a length W of about 5 mm at the lower surface F facing the panel receiving groove 21. Part of the length W of the upper lip 24, i.e., a width W1 of about 1 mm of the inner edge portion, is defined by a round sponge rubber strip S1. The weatherstrip 2 can be formed by a double layer extrusion process.

The thus-constructed weatherstrip 2 is mounted to the outer periphery of the glass panel 1' in a manner similar to the embodiment of FIG. 3. More particularly, after a primer treatment, the adhesive is applied to the panel receiving groove 21, and the weatherstrip 2 is then fitted to the outer peripheral edge of the glass panel 1'. An adhesive is then applied to the vertical extention 3' of the sliding roof inner panel 3, and the vertical extention 3' is inserted into the gripping groove 20 of the weatherstrip 2 to hold the sliding roof inner panel 3 to the weatherstrip 2.

Figure 2B:
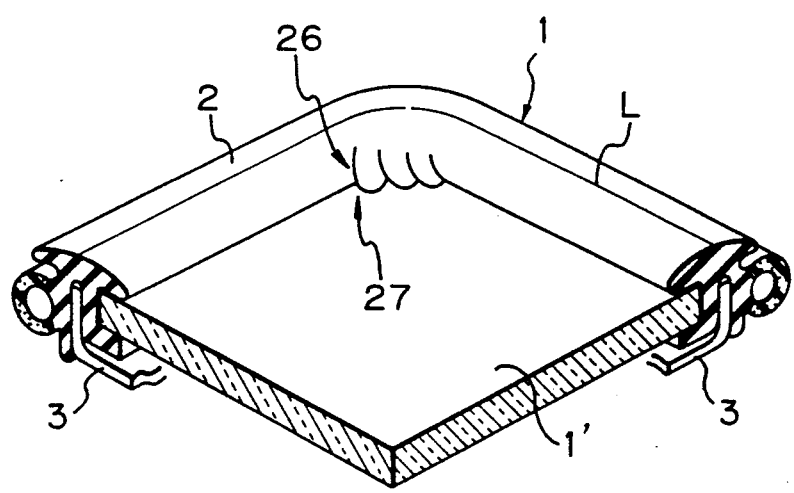

With this construction, since the sponge rubber strip S1 at the inner free end portion of the upper lip 24 provides a high bonding strength, the upper lip 24 is firmly bonded to the upper surface of the glass panel 1' and will not create the gap 27 or puckering 26 shown in FIG. 2B. Therefore, the weatherstrip is provided with an enhanced appearance.

Furthermore, since the upper lip 24 is most firmly fitted at the inner edge, a separation at the inner edge will not occur.

In addition, since the inner edge of the upper lip 24 is formed from a sponge rubber strip S1 which has high elasticity, bending deformation at the corner can be absorbed by the sponge strip S1.

Figure 4B:
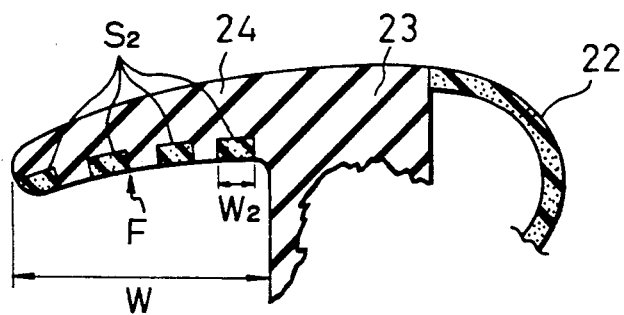

Rather than the sponge rubber strip S1 shown in FIG. 4A, a plurality of sponge rubber strips S2, each having a width less than or equal to 1 mm, can be provided in parallel to each other, on the lower surface F of upper lip 24 which faces the panel receiving groove 21. At least one of the sponge rubber strips S2 is provided at the inner edge of the upper lip 24, as shown in FIG. 4B. The remaining portions of the weather strip may be identical to those of the weather strip of FIG. 3 or 4A with the hollow seal section 22 being either solid rubber or (as shown) sponge rubber. The thus constructed weatherstrip 2 is applied to the sliding roof panel 1 in the same manner as in the embodiment of FIG. 4A, but because of the use of a plurality of sponge rubber strips S2, which have a substantially high bonding ability, and because one of the strips is provided at the inner edge of the upper lip 24, a firm bonding of sufficient strength can be obtained between the upper lip 24 of the weatherstrip 2 and the upper surface of the glass panel 1'. Therefore, no gap 27 or puckering 26, as observed in the prior art, occurs.

Figure 4C:
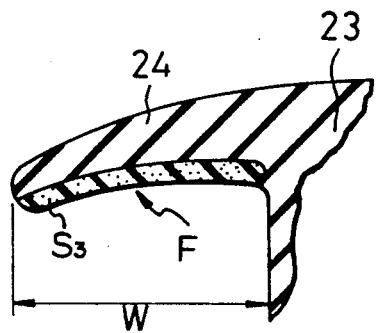

In the embodiment of FIG. 4C, a sponge rubber layer S3 is formed on the entire lower surface F of the upper lip 24 of the weatherstrip 2. The remaining construction is substantially identical to that of the embodiments of FIGS. 3, 4A, and 4B, and the hollow seal section (not shown) can be either solid rubber or sponge rubber.

With the shown construction, the weatherstrip 2 is easier to manufacture than the embodiment of FIG. 4B. Furthermore, this embodiment exhibits a higher bonding strength than that of the embodiment of FIG. 4B, because it has a wider contact area with the upper surface of the glass panel 1'.

As set forth above, since the weatherstrip 2 according to the present invention has an elastic portion of uneven surface structure and higher elasticity than upper lip 24 integrally formed on the upper lip 24, such as sponge rubber, which faces the panel receiving groove 21, at least at the inner edge thereof, a satisfactorily high bonding strength can be obtained when bonding the upper lip 24 to the upper surface of the glass panel 1'. Furthermore, the presence of the sponge rubber material at the inner free end portion of the upper lip 24 ensures that the upper lip 24 will not peel away from the upper surface of the glass panel 1'.

To demonstrate the advantage of the weatherstrip of the present invention, the following experiments were performed. In these experiments, the weatherstrip 2 was cut at the line C—C of FIG. 3, and a 180° peel test was performed only for the upper lip 24 fixed to the glass panel surface. More particularly, the 180° peel test was performed by pulling the upper lip 24 adhered to the glass panel surface in the longitudinal direction, to peel the same from the glass panel surface. The results of the peel test are shown in the following table.

| SAMPLE | LOWER SURFACE (F) CONSTRUCTION (No Surface Treatment by Buffing) | BONDING STRENGTH (kg/5 mm) | MODE OF DESTRUCTION |
| --- | --- | --- | --- |
| No. 1 Prior Art (FIG. 2A) | Only Solid Rubber | 0.85 | Peeling at Interface with Solid Section |
| No. 2 (FIGS. 3 & 4A) | Sponge Rubber 1 mm length at Inner End, Remainder Solid Rubber | 1.50 | Rubber Shearing at Sponge Section and Peeling at Interface with Solid Section |
| No. 3 (Mod. FIGS. 3 & 4A) | Sponge Rubber 2 mm length at Inner End, Remainder Solid Rubber | 1.18 | |
| No. 4 (FIG. 4C) | Only Sponge Rubber | 1.08 | Sponge Section Shearing because of its Weakness; No Peeling at the Surface of Adhesion |

As clear from the results shown above, the bonding strengths of Sample Nos. 2–4 are higher than the prior art, the FIG. 3 and 4A embodiments with the shorter sponge rubber length being the best. As to the FIG. 4C embodiment (Sample No. 4) since the sponge rubber is itself weak, it sheared before it could be peeled off because the sponge rubber itself has a good bonding strength as the chart shows.

It should be noted that the weatherstrip according to the present invention is applicable not only for glass sliding roof panels but also for steel sliding roof panels.

As set forth above, the weatherstrip according to the present invention has a sponge rubber material at least on the inner edge of a portion of the upper lip of the sliding roof panel, and the sponge rubber material faces the panel receiving groove. Accordingly, due to the porous or uneven surface of the sponge rubber material, an improved interface bonding strength can be obtained between the weatherstrip and the sliding roof panel and this effectively prevents a peeling of the upper lip of the weatherstrip from the surface of the sliding roof panel.

In addition, due to the presence of the sponge rubber material at least at the inner edge of the upper lip, deformation which causes a clearance or puckering at the corners is prevented. Therefore, the weatherstrip according to the present invention assures a longer life and enhanced external structural appearance.

It should be noted that, although the illustrated embodiments are directed to a weatherstrip formed by an extrusion process, the proposed construction for the weather strip can be applied to weatherstrips formed by molding, to provide an enhanced bonding strength and better appearance.

Furthermore, it should be appreciated that, although the illustrated embodiments specifically relate to a weatherstrip for the sliding roof panel of an automotive vehicle, the present invention is also suitable for various applications which require a weatherstrip to be applied across a bent or curved portion.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. A weatherstrip for an automotive vehicle comprising:

an upper lip and a support section defining therebetween a panel receiving groove;

a main body from which said upper lip and said support section project and a hollow seal on a side of the weatherstrip opposite to said panel receiving groove; and a sponge material provided at least on a portion of said upper lip and in a facing relation to said panel receiving groove, wherein said sponge material is firmly bonded to an upper surface of a panel member inserted in said panel receiving groove.

2. A weatherstrip as set forth in claim 1, wherein a plurality of strips of sponge material are defined on an inner surface of said upper lip.

3. A weatherstrip as set forth in claim 1, wherein a strip of sponge material is disposed at least at a free edge of said upper lip.

4. A weatherstrip as set forth in claim 1, wherein said sponge material covers an entire inner surface of said upper lip.

5. A weatherstrip for an automotive vehicle comprising:

an upper lip and a support section defining therebetween a panel receiving groove;

a sponge material provided at least on a portion of said upper lip and in a facing relation to said panel receiving groove;

a main body from which said upper lip projects; and a hollow seal on a side of the weatherstrip opposite to said panel receiving groove, wherein said sponge material is a portion of a sponge material layer extending from said hollow seal, over an upper surface of said main body and said upper lip at least to a free edge of said upper lip.

6. A weatherstrip for an automotive vehicle, comprising:

a main body made of a solid elastic material, said main body having an upper lip and a lower lip extending in substantially parallel relation to each other to define therebetween a groove extending in parallel to a longitudinal axis of said main body; and an elastic portion coupled to said upper lip and having a lower surface in a plane common with that of a lower surface of said upper lip whereby said lower surfaces engage a panel member when inserted in said groove, said elastic portion being firmly bonded to an upper surface of said panel member, said elastic portion having an uneven surface structure and being formed from a sponge rubber material of higher elasticity than said main body.

7. A weatherstrip as in claim 6 wherein said elastic edge portion is a strip of sponge material disposed at an edge of said upper lip.

8. A weatherstrip as in claim 6 wherein said elastic edge portion is a portion of sponge material which extends from an edge of said upper lip over the top of said upper lip.

9. A weatherstrip as in claim 9 including a hollow seal portion disposed on a side of said main body opposite said groove and being an extension of said sponge material.

* * * * *